Sept. 18, 1923.  1,468,007
A. E. DOMAN
REGULATING SYSTEM FOR ELECTRIC GENERATORS
Filed Nov. 21, 1919
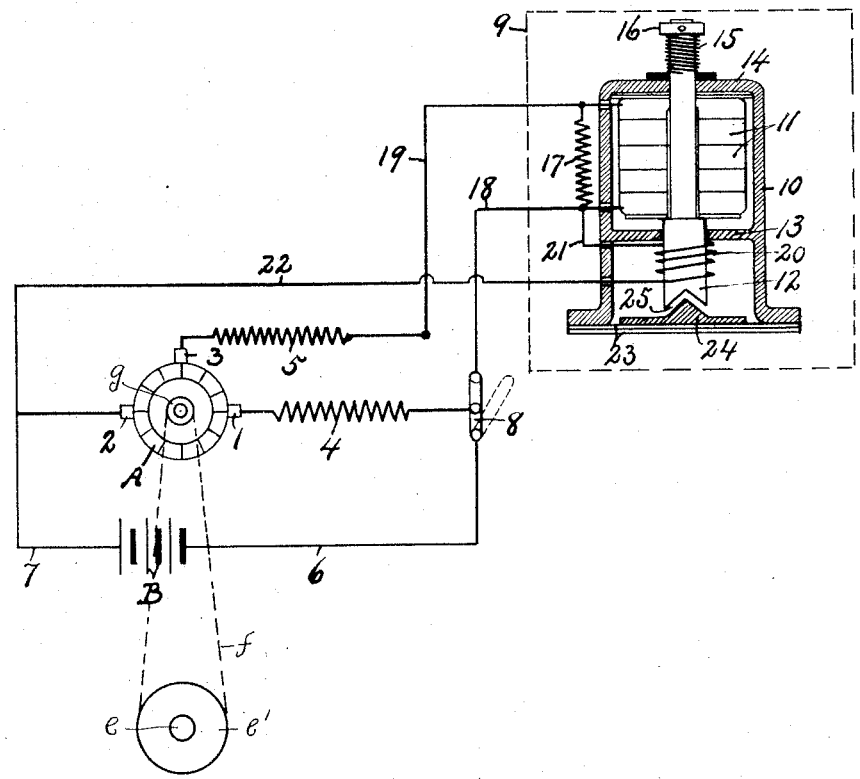
Inventor
A. E. Doman
By Howard P. Denison
Attorney.

Patented Sept. 18, 1923.

1,468,007

UNITED STATES PATENT OFFICE.

ALBERT E. DOMAN, OF ELBRIDGE, NEW YORK, ASSIGNOR TO DOMAN MANUFACTURING CORPORATION, OF ELBRIDGE, NEW YORK, A CORPORATION OF NEW YORK.

REGULATING SYSTEM FOR ELECTRIC GENERATORS.

Application filed November 21, 1919. Serial No. 339,549.

*To all whom it may concern:*

Be it known that I, ALBERT E. DOMAN, of Elbridge, in the county of Onondaga, in the State of New York, have invented new and useful Improvements in Regulating Systems for Electric Generators, of which the following, taken in connection with the accompanying drawings, is a full, clear, and exact description.

This invention relates to certain improvements in electric current or voltage regulators for variable speed dynamo electric machines of the "third brush" type, adapted to be used more particularly in connection with a storage battery on motor vehicles having an internal combustion engine as its motive power by which the dynamo is driven in any well-known manner not necessary to herein illustrate or describe, so that the dynamo current may be used for charging the battery and both sources of electric energy used for starting, lighting, and ignition purposes.

It is well known that a dynamo of the "third brush" type in which the shunt field winding is connected with the third brush serves in a measure to automatically regulate its current output under widely varying speeds, but it is equally well known that when charging a battery as the latter becomes more fully charged, instead of gradually reducing the charge as the charging rate and battery voltage increase, it actually increases the charging rate, which, if continued under certain conditions, will eventually overheat and ruin the battery as a result of overcharging.

The main object, therefore, of my present invention, like that of my pending applications Serial No. 339,548, filed November 21, 1919, and Serial No. 339,550, filed November 21, 1919, is to provide a system of current or voltage regulation for use in connection with this type of dynamo by which it will be practically impossible under normal working conditions to overcharge or overheat the battery under any speed of the dynamo and thereby to prolong the life and energy of the battery.

This result may be accomplished by providing any suitable means whereby a variable resistance may be automatically cut into the shunt field circuit in such manner as to cause said resistance to gradually increase as the speed and resulting voltage of the dynamo increases beyond a safe charging limit, and one of the specific objects of my present invention is to provide magnetically operated means controlled by the dynamo current for varying the degree of pressure and thereby varying the resistance of a carbon or analogous pile which is connected in the shunt field circuit of the dynamo.

Another object is to connect a separate resistance in the shunt field circuit in parallel with the carbon pile to act as a current stabilizer and to prevent actual opening of the shunt field circuit should the members of said pile become entirely separated, due to rapid fluctuations or abnormal voltages.

It is also well known that during the colder periods the internal resistance of a storage battery is considerably greater than in the warmer periods; that it requires more current to operate the starting motor; that the discharge of the battery for lighting purposes is longer while the average period of use of the car for recharging the battery is considerably less; and one of the objects of my present invention is to provide simple and efficient means for automatically counteracting the effects of these widely varying temperatures upon the regulating system.

Other objects and uses will be brought out in the following description.

The drawing represents diagrammatically the connected circuits of a dynamo electric machine of the "third brush" type and storage battery, including therein my improved automatic current or voltage regulator.

The dynamo electric machine is indicated by a commutator —A— having three brushes, 1, —2—, and —3—, a series winding —4—, and a shunt field winding —5—, the shunt field winding being connected with the third brush —3—.

A storage battery —B— is connected by wires —6— and —7— across the terminals of the dynamo circuit through the medium of a switch —8— which controls both circuits. The current or voltage regulator is adapted to be enclosed in a suitable housing —9—, shown by dotted lines, and comprises a hollow casing —10— of magnetizable material containing a carbon or analogous resistance pile —11— and an electric magnetic plunger —12—.

The casing —10— is preferably made in the form of an inverted cup having a transverse partition —13— and a top wall —14— provided with coaxial registering apertures for receiving and guiding the plunger —12— in its vertical movement.

This plunger also extends loosely through alined apertures in the members of the carbon pile —11— and its lower end which is guided in an opening in the partition —13— is enlarged to form a shoulder for engaging the under side of the lowermost member of said pile.

A coiled spring —15— is interposed between the upper wall —14— of the case —10— and a shoulder —16— on the upper end of the plunger —12— for exerting upward pressure on said plunger and thereby producing a corresponding pressure between the elements of the resistance pile —11—.

This resistance pile —11— is connected in the shunt field circuit of the dynamo in series with the shunt field winding —5— and its resistance is varied in a manner hereinafter described by varying the pressure between its members for the purpose of increasing the resistance in the shunt field circuit as the speed of the dynamo increases.

An additional resistance —17— is connected across the shunt field circuit in parallel with the variable resistance —11— to act as a current stabilizer and to maintain a positive resistance connection in the shunt field circuit in case the members of the carbon pile should become separated sufficiently to break the circuit therethrough, as, for example, by rapid current fluctuations or abnormally high voltages, it being understood that the current passing through the resistance of the part —17— will vary directly as the resistance in the carbon pile.

One end of the carbon pile is connected by the wire —18— to the switch —8—, while the other end is connected by the wire —19— to the series winding —5—, which, in turn, is connected to the third brush —3— of the dynamo so that the circuit through the variable resistance is from the dynamo brush —1—, series coil —4—, switch —8—, and wire —18—, through the carbon pile —11— and return through the wire —19— and shunt field winding —5— to the brush —3—.

The resistance —17— is preferably connected across the wires —18— and —19— and is therefore in the same circuit, but shunts the carbon pile under abnormal fluctuations or high voltages in case the members of the carbon pile should become separated sufficiently to break the circuit therethrough.

A voltage regulating coil —20— is wound around the enlarged lower end of the magnetizable plunger or core —12— and is connected across the dynamo and battery circuits, one end being connected by a wire —21— to the wire —18— leading from the dynamo brush —1— and corresponding pole of the battery —B— through the switch —8—, while the other end is connected by a wire —22— to the dynamo brush —2— and to the corresponding pole of the battery through the wire —7—.

A thermostatic bar —23— is secured to and across the lower open end of the case —10— and carries a magnetizable armature —24— adapted to cooperate with the core —12— when the coil —20— is energized to establish a local magnetic circuit through the core —12—, partition —13—, case —10—, thermostatic conductor —23—, armature —24— and a variable air gap —25— between the armature and adjacent end of the core.

The cooperative faces of the core —12— and its armature —24— are preferably V-shaped to increase the area of attraction across the air gap —25—.

The core —12— and coil —20— constitute an electro-magnet, and it therefore follows that when the coil —20— is energized its core will be attracted and moved endwise by and toward the member —24—, the effect of which is to relieve the pressure of the spring —15— upon the members of the pile —11— when the dynamo voltage in the coil is sufficient to overcome the tension of the spring, thereby increasing the resistance in the shunt field circuit as the voltage in the coil —20— increases by an increased speed of the dynamo, so that the degree of resistance which is inside the shunt field circuit varies with the speed, and by properly adjusting the spring —15— and other parts of the regulator provides an automatic regulation of the dynamo current under widely varying speeds and within such limits as will prevent injury to the battery when the latter is being charged.

*Thermostatic compensator.*

Owing to the fact that the internal resistance of a storage battery varies inversely with the temperature, it is evident that it will require a higher voltage for charging in cold weather than in warm weather and in order that the regulator may automatically adjust itself to these widely varying temperature conditions, I have provided the thermostatic bar —23—, the members of which have different coefficients of expansion, and are adjusted so that the air gap —25— will vary inversely with varying temperatures, that is, the air gap will be increased as the temperature of the thermostatic bar is reduced, thus requiring a higher degree of voltage to operate the electro-magnetic core —12— and thereby reduce the pressure between the members of the carbon pile —11— for increasing the resistance than would be required under higher temperatures.

The effect of this operation is to cause the dynamo to charge the battery with a higher degree of voltage as the temperature lowers and with a less degree of voltage as the temperature rises, to conform to the variations of internal resistance in the battery.

The operation of my invention will now be readily understood in reference to the foregoing description and the accompanying drawing, but it is evident that the particular means for regulating the voltage in the battery charging circuit under varying speeds of the dynamo as well as under varying temperatures may be modified in various ways without departing from the spirit of the invention.

The dynamo is shown as connected by pulleys —g— and —e'— and a belt —f— to the crank shaft —e— of an internal combustion engine to be driven thereby and also constitutes an electric motor receiving current for charging, lighting, and ignition purposes, as previously explained.

What I claim is:

1. A voltage regulator for variable-speed dynamo-electric machines, comprising relatively movable parts spring pressed toward each other, a resistance pile adapted to be connected in the dynamo circuit and having its members yieldingly pressed together by said parts, electro-magnetic means adapted to be energized by the dynamo current for reducing the pressure of said members against each other as the voltage of the dynamo increases beyond a certain degree, said means including an armature for the magnet and a thermostatic member supporting the armature and operatively secured to one of the first-named parts.

2. A voltage regulator for variable speed dynamo electric machines comprising relatively movable parts spring pressed toward each other, one of the parts constituting the core of an electro-magnet, a resistance pile adapted to be connected in the dynamo circuit and having its members yieldingly pressed together by said parts, an electro-magnet winding around the core, and adapted to be connected in the dynamo circuit, an armature for the electro-magnet and a thermostatic support for the armature adjusted to carry the armature away from the core as the temperature is lowered beyond a certain degree.

3. A regulator for variable speed dynamo electric machines comprising a housing of magnetizable material, an electro-magnet having a core movable lengthwise of and within the housing and spring pressed toward one end thereof, said magnet having its winding adapted to be connected in the dynamo circuit, a resistance pile within the housing and having its members yieldingly pressed together by and between the plunger and said end of the housing, an armature attracted by the magnet core when the latter is energized, and a thermostatic bar secured to the other end of the housing and supporting said armature, said thermostatic bar being adjusted to move the armature toward and away from the core as the temperature rises and falls beyond a certain degree.

In witness whereof I have hereunto set my hand this 5th day of November 1919.

ALBERT E. DOMAN.

Witnesses:
H. E. CHASE,
MARGARET L. STOUP.